United States Patent [19]

Serikawa et al.

[11] Patent Number: 4,722,124
[45] Date of Patent: Feb. 2, 1988

[54] METHOD OF MANUFACTURING THE WRITING TIP OF A BALL POINT PEN

[75] Inventors: Toshiaki Serikawa, Zushi; Hiroshi Takagi, Yokohama, both of Japan

[73] Assignee: Mitsubishi Pencil Co., Ltd., Japan

[21] Appl. No.: 881,265

[22] Filed: Jul. 2, 1986

[51] Int. Cl.⁴ .............................................. B23P 11/00
[52] U.S. Cl. .................................. 29/441 BP; 15/444; 15/445; 401/216; 401/220
[58] Field of Search ................... 29/441 BP; 401/209, 401/213, 216, 220; 15/444, 445

[56] References Cited

U.S. PATENT DOCUMENTS 3,181,228 5/1965 Droubay ........................ 29/441 BP
3,470,603 10/1969 Azzariti ......................... 29/441 BP Primary Examiner—Howard N. Goldberg
Assistant Examiner—Ronald S. Wallace
Attorney, Agent, or Firm—Parkhurst & Oliff

[57] ABSTRACT

A method of manufacturing the writing tip of a ball point pen which has the steps of inwardly pressing the end of a fine metallic tube at the entire periphery to form a drawn portion, drawing the inner wall of the drawn portion to form a ball holding portion, forming a slot for leading ink at the ball seat portion, inserting the ball into the ball holding portion, and allowing the ball to be held at the ball holding portion. Thus, the durability of the tube can be improved, and the design of the supply passage of ink can be freely performed without restriction in the diameter of the ball.

4 Claims, 7 Drawing Figures

METHOD OF MANUFACTURING THE WRITING TIP OF A BALL POINT PEN

BACKGROUND OF THE INVENTION

This invention relates to a method of manufacturing the writing tip of a ball point writing instrument and, more particularly, to a method of manufacturing the tip of a ball point writing instrument which can improve the durability by the formation of a fine metallic tube and which can freely design an ink supply passage without restriction in the diameter of the ball.

A conventional method of manufacturing the writing tip of a ball point pen from a fine metallic tube has the steps of inwardly pressing a plurality of positions on the same peripheral edge of the outer peripheral surface in the vicinity of the end of the metallic tube to project and form a seat for a ball on the inner wall, inserting the ball into the end of the tube, and then caulking the edge of the tube.

However, according to the conventional method, the inner diameter of the tube is required to be slightly larger than the diameter of the ball. Accordingly, the size of an ink supply core is limited to smaller than the size of the inner diameter of the tube. Thus, sufficient ink cannot be supplied to the tip, and the ink cannot be supplied particularly in an aqueous ink ball point pen.

SUMMARY OF THE INVENTION

Accordingly, an object of the present invention is to provide a method of manufacturing the writing tip of a ball point writing instrument which can eliminate the aforementioned drawbacks and disadvantages of the conventional method and can improve the durability thereof by the advantageous formation of a fine metallic tube.

Another object of the present invention is to provide a method of manufacturing the writing tip of a ball point writing instrument which can freely design an ink supply passage without restriction with the diameter of a ball.

Still another object of the present invention is to provide a method of manufacturing the writing tip of a ball point writing instrument which can provide high quality for the writing tip.

Still another object of the invention is to provide a method of manufacturing the writing tip of a ball point writing instrument which can select the diameter of a fine metallic tube in accordance with the diameter of an ink guide core as required by the necessary ink quantity.

According to one aspect of the present invention, there is provided a method of manufacturing the writing tip of a ball point writing instrument which comprises the steps of inwardly pressing the end of a fine metallic tube over the entire periphery to form to gradually draw the tube toward the end, thereby forming a drawn portion, drilling the inner wall of the drawn portion from the direction of the end opening to form a ball holding cylindrical portion and a ball seat portion, thereby constructing a ball holding portion, forming a slot for introducing ink along a through hole at the ball seat portion, inserting the ball into the ball holding portion, and then caulking the edge of the end opening to hold the ball in the holding portion.

BRIEF DESCRIPTION OF THE DRAWINGS

The above and other related objects and features of the invention will be apparent from a reading of the following description of the disclosure found in the accompanying drawings and the novelty thereof pointed out in the appended claims. p

FIGS. 3 to 7 show the machining state of a fine metallic tube for the ball point pen in the respective steps; wherein FIGS. 3 and 4 are longitudinal sectional views of the essential part of the tube in the caulked state; FIG. 5 is a longitudinal sectional view of the essential part of the tube in the machined state from the drilled hole from the direction of the rear end opening of the tube; FIG. 6 is a longitudinal sectional view of the essential part in the drilled state from direction of the front end opening, and FIG. 7 is a longitudinal sectional view of the essential part of the tube in the state formed with an ink guide hole at the seat.

DESCRIPTION OF THE PREFERRED EMBODIMENTS

The present invention will now be described in more detail with reference to the accompanying drawings.

Figure 1:
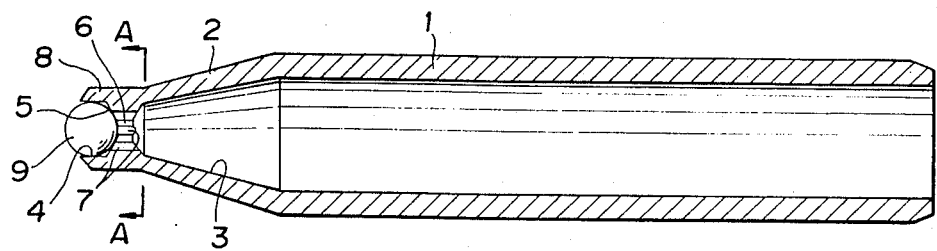
FIG. 1 is a longitudinal sectional view of of a preferred embodiment of a ball point pen manufactured according to the method of the present invention.
Figure 2:
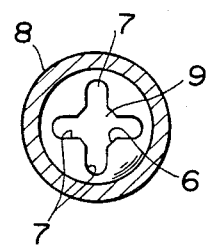
FIG. 2 is an enlarged sectional view of the pen taken along the line A—A in FIG. 1.
Figure 3:
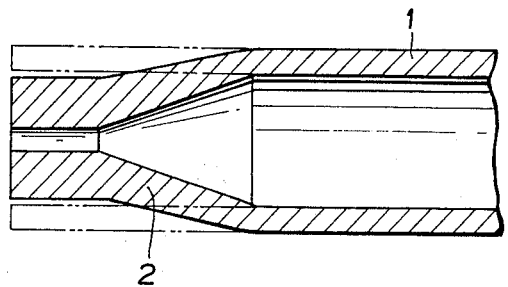

In the drawings, reference numeral 1 designates a fine metallic tube. A drawn portion 2 is formed, as shown in FIG. 3, at the end of the tube 1 by inwardly pressing the entire periphery toward the end so as to be gradually drawn toward the front end. In other words, the tube 1 is drawn toward the end, for example, by swaging so as to be gradually drawn toward the front end, thereby forming the drawing portion 2 (FIG. 3).

Figure 5:
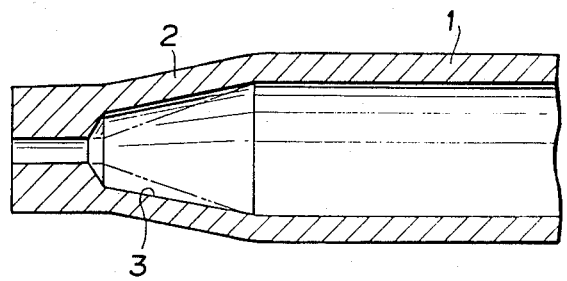

Then, the inner wall of the drawn portion 2 thus drawn is drilled from the direction of the rear end opening, thereby expanding and forming a guide passage 3 of an ink leading core (not shown) which is made of plastic linear unit or the like (FIG. 5).

Figure 4:
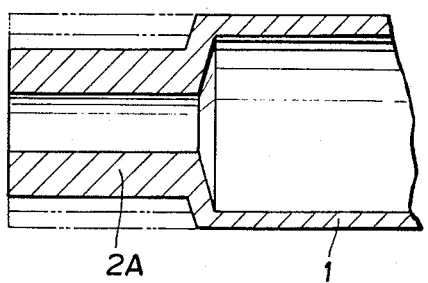

The drawn portion 2 is sharpened at the end as shown in FIG. 3. Further, the portion 2 may also be formed in a small cylindrical shape through a stepped part 2A as shown in FIG. 4, and in this case it is unnecessary to drill from the direction of the rear end opening of the tube 1.

Figure 6:
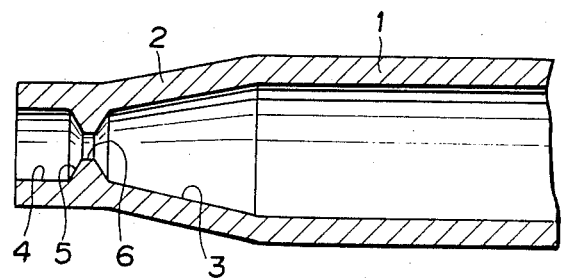

The drawn portion 2 thus formed is drilled from the direction of the front end opening at the inner wall of the drawn portion 2 to form a ball holding cylindrical portion 4 and a ball seat portion 5 (FIG. 6).

Figure 7:
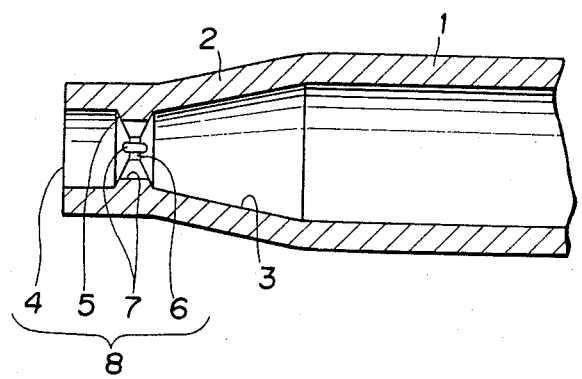

Thereafter, the wall of the through hole 6 of the ball seat portion 5 is formed with a plurality of ink leading slots radially in parallel with a hole core (FIG. 7).

The tube 1 is constructed further with a ball holding portion 8 at the end through the drawing, drilling and slot forming steps. After a ball 9 is inserted into the ball holding portion 8, the end opening edge is bent and formed inwardly and is thus caulked, thereby obtaining a writing tip of a ball point pen.

According to the present invention, the end of the tube 1 is inwardly pressed over the entire periphery and is gradually drawn toward the front end so as to be drawn toward the end, thereby forming the drawn portion 2. Therefore, a difficulty in the conventional tip of the ball point pen which is manufactured by projecting and forming a seat on the inner peripheral wall surface in a manner of inwardly pressing the part of the outer peripheral surface in the vicinity of the end of the tube, and hence a drawback that the inner diameter of the tube is determined in accordance with the diameter of a ball can be eliminated. More particularly, the diameter of the tube is selected by the diameter of an ink leading core in response to the necessary ink quantity. The ink leading core made of plastic linear unit can be increased in the diameter as thick as possible, thereby enabling to approach the core to the vicinity of the rear end of the ball 9 and sufficiently and stably supplying the ink to the core.

Further, the inner wall of the drawn portion 2 is drilled from the direction of the end opening to form the ball holding cylindrical portion 4 and the ball seat portion 5. Accordingly, the dimensional size of the inner wall surface of the drawn portion 2 formed by plastic working can be improved, thereby improving the stable of the ink. Then, the surface state of the inner wall surface is smoothened, thereby improving the writing taste with smooth rolling of the ball 9.

In addition, the ink guide slot 7 is formed along the through hole 6 at the ball seat portion 5. Accordingly, sufficient ink can be supplied from the ink leading core, thereby eliminating the insufficient ink supply or scratchy writing.

Moreover, the pen is formed of a fine metallic tube 1 thus advantageously formed. Accordingly, its durability is excellent as compared with the conventional tip of the ball point pen made of other synthetic resin.

As described above, according to the present invention, the durability of the writing tip can be improved, the design of the ink supply passage can be freely performed without restriction in the diameter of the ball, thereby supplying stably the ink, and high quality writing tip of the ball point pen can be provided.

What is claimed is:

1. A method of manufacturing the writing tip of a ball point writing instrument comprising the steps of:

inwardly pressing by swaging a front end of a fine metallic hollow tube over the entire periphery thereof to gradually draw the tube toward the front end, thereby forming a drawn portion;

drilling a front side portion of the front end to a substantially intermediate position of an inner wall of the drawn portion from the direction of a front end opening thereof for holding a ball to form a ball holding cylindrical portion and a ball seat portion at a rear end of the ball holding cylindrical portion, thereby constructing a ball holding portion in a drilled portion of the drawn portion;

providing communication between the ball holding portion and an interior of the fine metallic hollow tube of the drilled portion via a through hole;

forming a slot for introducing ink along the through hole at the ball seat portion;

drilling the inner wall of a rear side portion of the drilled portion from a rear end opening of the fine metallic hollow tube on the opposite side to the ball holding portion to expand the slot for introducing ink.

inserting the ball into the ball holding portion; and then caulking the edge of the end opening thereof to hold the ball in the holding portion.

2. The method according to claim 1, wherein said drilling step includes drilling the inner wall of the drawn portion from the direction of the rear end opening, thereby expanding and forming a guide passage of an ink leading core which is made of plastic linear unit.

3. The method according to claim 1, wherein after the drilling step, the wall of the through hole of the ball seat portion is formed with a plurality of ink leading slots radially in parallel with a hole core.

4. The method according to claim 1, wherein the tube is constructed further with the ball holding portion at the front end through drawing, drilling and slot forming steps.

* * * * *